Oct. 15, 1957 W. J. WEISZ ET AL 2,810,068

PORTABLE ELECTRONIC UNIT

Filed Feb. 24, 1953

INVENTORS.
William J. Weisz,
BY Glen R. Madland,
Norman L. Mueller
Atty.

United States Patent Office 2,810,068

Patented Oct. 15, 1957

2,810,068

PORTABLE ELECTRONIC UNIT

William J. Weisz, Skokie, and Glen R. Madland, Elmhurst, Ill., assignors to Motorola, Inc., Chicago, Ill., a corporation of Illinois Application February 24, 1953, Serial No. 338,526

3 Claims. (Cl. 250—14)

The present invention relates generally to portable electronic units; and more particularly to a compact, portable, radio-telephone transmitting unit.

There is a positive need for portable radio-telephones today; both in the military forces and for civilian uses such as for the police, railroads and the like. Many such units have been devised in the past, but for the most part are unduly large and cumbersome for convenient handling.

It is, accordingly, an object of the present invention to provide an electronic unit that is constructed in an improved manner to be compact in size and light in weight, so as to be conveniently carried without unduly encumbering the operator.

Another object of the invention is to provide such an improved portable electronic unit having a self-contained power supply; and yet which is constructed to have an appropriate size, configuration and weight so that it may be carried with extreme ease and facility.

A feature of the invention is the provision of such an electronic unit in which the components thereof are supported on either side of a base plate which extend longitudinally within a casing, the base being supported on an end plate with the latter enclosing one end of the casing.

A further feature of the invention is the provision of such a unit which utilizes printed electronic circuitry as a factor materially contributing to its reduced size.

Yet another feature of the invention is the provision of such an electronic unit which, despite its extremely small and compact size, has the required electronic elements supported therein in a manner to be adjusted and aligned simply and expeditiously.

Another feature of the invention is the provision of such an electronic unit having an antenna structure constructed and shaped in an improved manner to constitute a handle for the unit.

A still further feature of the invention is the provision of such an electronic unt in which the various electronic components are completely and effectively shielded from external influences.

The above and other features of the invention which are believed to be new are set forth with particularity in the appended claims. The invention itself, however, together with further objects and advantages thereof may best be understood by reference to the following description when taken in conjunction with the accompanying drawing in which:

The portable electronic unit of the invention comprises basically a base plate with a top plate secured to one end thereof and disposed in a plane perpendicular to the plane of the base plate. A battery power supply for the unit is supported on one side of the base plate, and electronic circuit elements are supported on the other side thereof. Finally, a housing or casing is provided that surrounds the base plate and the aforesaid power supply and circuit elements and has an open end enclosed by the top plate.

Figures 1, 2, 3:
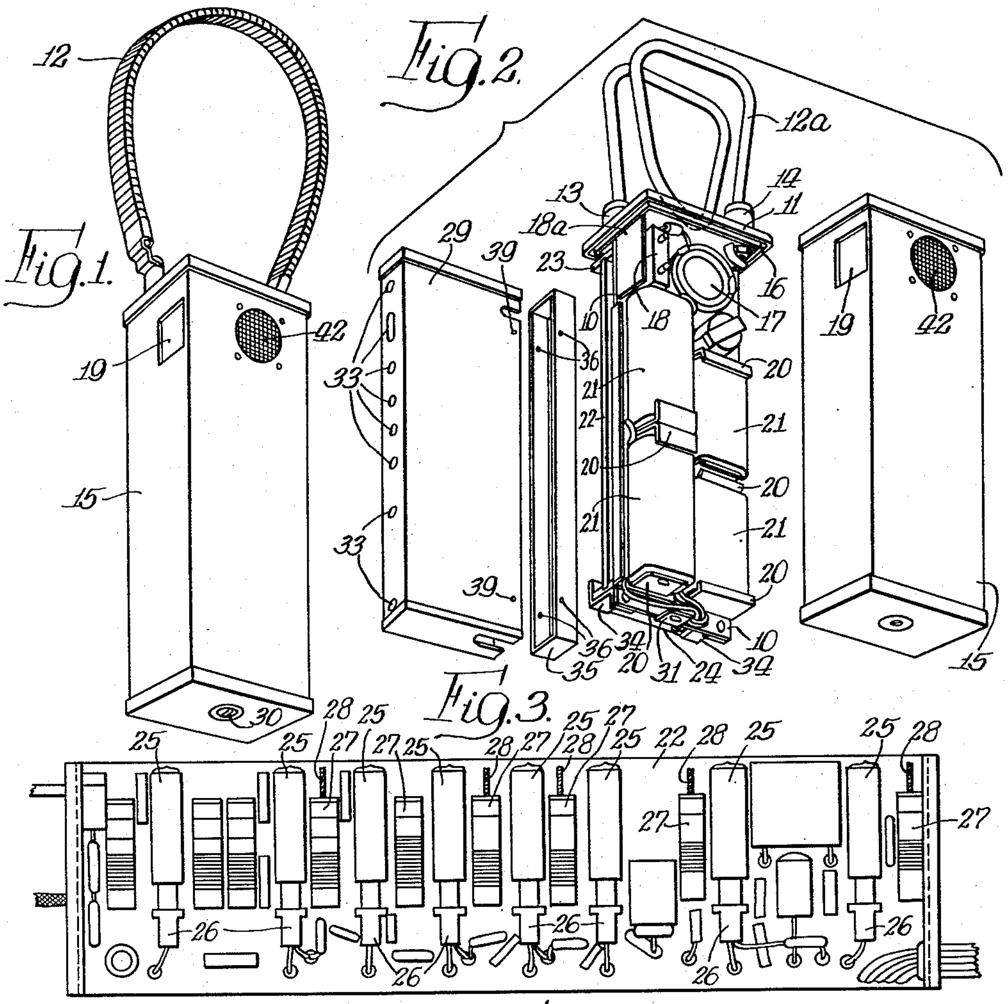
Fig. 1 is an external view of the electronic unit.
Fig. 2 is an exploded view of the unit with a modified antenna structure.
Fig. 3 shows a supporting panel which is incorporated into the unit and which supports the various electronic elements.

Referring now to the drawing, the electronic unit of the invention includes a base plate 10 of rectangular configuration having a rectangular top plate 11 secured to one end thereof and disposed in a plane perpendicular to the plane of the base plate. An antenna 12 is secured to the side of top plate 11 remote from base plate 10 on a pair of insulators 13 and 14, with electrical lead-ins for the antenna extending through the insulators and through the top plate. The antenna 12 of Fig. 1 comprises a flexible conductor, preferably of strip form looped from one insulator to another and surrounded by a spiralled flexible plastic strip. This enables the unit to be slipped over the arm of the operator leaving both his hands free. Alternately, as shown in Fig. 2, the antenna **12*a* may consist of a rigid conductor looped double between the insulators to be grasped by the hand of the operator. The antennas of 12 and 12*a* are loaded in an unbalanced manner to exhibit omnidirectional characteristics. When desired, a single vertical rod antenna may be used. The unit is provided with a unitary casing or housing 15 of rectangular cross-section which completely surrounds the base plate 10 and the various elements supported thereon, casing 15 having an open end which extends into a channel 16 extending around the edges of the top plate to be enclosed by the top plate. Casing 15 is held in place by a screw 30 passing through a debossed aperture in the bottom of casing 15 into a threaded lug 31 secured to base 10**.

A microphone 17 and a multiple push-button energizing switch 18 are mounted on one side of base plate 10 adjacent top plate 11, a mesh 42 being provided in casing 15 adjacent the microphone. The casing is also provided with an opening 19 adjacent switch 18, the opening having a resilient rubber covering so that switch 18 may be actuated from outside the casing. A flexible metal tab **18*a* is disposed between the actuating buttons of switch 18 and the rubber covering of opening 19** to assure operation of such buttons when the rubber is depressed.

A series of resilient clip means 20 are also supported on the same side of base 10 as the microphone and switch, and serve to support a battery power supply comprising a plurality of batteries 21. Two "A" batteries 21 are provided connected in parallel for supplying filament and heater current to the electron discharge devices of the transmitter, and two "B" batteries 21 are provided connected in series to supply excitation to the anodes and screens of such devices. The "A" batteries may conveniently be Eveready hearing aid 1.5 v. batteries, type 1016*e*; and the "B" batteries may be Eveready 30 v., type 413.

Figure 4:
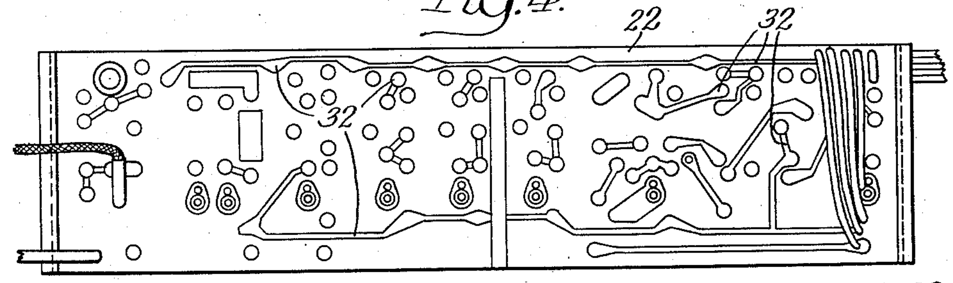
Fig. 4 is a view of the bottom of the panel of Fig. 3 showing the electronic circuit imprinted thereon.

An insulating panel 22 is supported on the other side of base plate 10 between a pair of upstanding end members 23 and 24 which space the panel slightly from base plate 10. Both sides of panel 22 have electronic circuits 32 imprinted thereon (Fig. 4), which imprinting may be effectuated by the process disclosed and claimed in copending application Serial No. 120,165 filed October 7, 1949, in the name of Temple Nieter entitled "Electroplating Process" which issued January 11, 1955, as Patent 2,699,424, and whose continuation application issued on the same day as Patent 2,699,425, and which is assigned to the present assignee. A plurality of electronic components are supported on panel 22, and are electrically connected to the aforementioned circuit 32 imprinted thereon. The electronic components include a plurality of flat electron discharge devices 25 of the well-known sub-miniature type which are mounted on their edges to reduce the longitudinal dimensions of the unit as much as possible. Devices 25 are supported in well-known sub-miniature tube sockets 26, likewise, mounted on their edges and supported by the leads extending from the sockets to the imprinted circuit 32 on the panel and also cemented to the panel.

Also included among the electronic components on panel 22 are a series of coupling inductance coils or transformers 27, and the inductive value of each coil may be varied by means of a tuning core having a threaded control rod 28. All the control rods extend from the coils in the same direction along axes transversing panel 22. A metallic inner housing 29 is provided which slips over the end members 23, 24 of panel 22 and surrounds and shields the panel and the components supported thereon. Inner housing 29 has one end extending behind channel 16 in top plate 11 and engaging behind channel 16 so as rigidly to support panel 22 on base plate 10. A pair of brackets 34 are secured to base plate 10 and support the other end of housing 29. Housing 29 has a series of apertures 33 in respective alignment with control members 28, so that the inductance coils or transformers 27 may be conveniently adjusted for aligning purposes. This is effected merely by removing casing 15 and adjusting control members 28 through apertures 33 in housing 29 by a suitable tool. A bottom 35 for the inner housing is provided which snaps into the housing and is held in place by dimples 36 which engage small holes 39 in the housing. The bottom may be removed without necessitating the removal of housing 29 to enable simple repairs and adjustments to be made to the leads and connections to sockets 26 and adjacent components.

A constructed embodiment of the disclosed unit has a length of 7¼ inches, a width of 2⅝ inches, and a depth of 2 inches. The transmitter is most suitable for operation in the 152–174 megacycle frequency range, and has a power output of 20–30 milliwatts.

The invention provides, therefore, a new and improved portable, self-contained electronic unit which is extremely compact in size, rugged in construction, and which may be carried with extreme facility. Moreover, the invention provides a completely shielded unit so that the effect of hand capacity and other extraneous interferences are reduced to a minimum.

While a particular embodiment of the invention has been shown and described, modifications may be made and it is intended in the appended claims to cover all such modifications as fall within the true spirit and scope of the invention.

We claim:

1. A portable electronic unit including in combination, a rectangular shaped base plate, a top plate secured to one end of said base plate and disposed in a plane perpendicular to the plane of said base plate, means secured to one side of said base plate for supporting a battery power supply, a panel having an electronic circuit imprinted thereon for supporting electronic circuit elements in electrical contact with the aforesaid imprinted circuit, a plurality of variable inductance coils included in the aforesaid electronic circuit elements mounted along said panel on respective axes traversing said panel and each having a control stud extending along such axes towards one side of said panel, a metallic inner housing surrounding said panel and removably secured to the other side of said base plate, said inner housing having apertures in one side thereof respectively aligned with the aforesaid control studs, and an outer housing surrounding said base plate and the aforesaid supporting means and said metallic inner housing and having an open end enclosed by said top plate.

2. A portable transmitting unit including in combination, a rectangular shaped base plate, a rectangular top plate secured to one end of said base plate and disposed in a plane perpendicular to the plane of said base plate, resilient clip means secured to one side of said base plate for supporting a battery power supply, a microphone and a switching device supported on said one side of said base plate adjacent said top plate, a panel having an electronic circuit imprinted thereon for supporting electronic circuit elements in electrical contact with the aforesaid imprinted circuit, a plurality of variable inductance coils included in the aforesaid electronic circuit elements mounted along said panel on respective axes traversing said panel and each having a control stud extending along such axes towards one side of said panel, a metallic inner housing surrounding said panel and removably secured to the other side of said base plate, said inner housing having apertures in one side thereof respectively aligned with the aforesaid control studs, an antenna secured to said top plate on the side thereof remote from said base plate, and a unitary outer housing having a rectangular cross-section surrounding said base plate and the elements supported thereon, said outer housing having an open end enclosed by said top plate.

3. A portable, self-contained electronic communication unit adapted to be manually carried by a user, including in combination, an elongated base frame, a first housing portion secured to one end of said frame, means secured to one side of said frame for supporting a battery power supply for the unit, an insulating panel having an electronic circuit imprinted thereon and supporting electronic elements in electrical contact with the imprinted circuit, an enclosing shield for said panel formed to surround only said panel and said electronic elements thereon to provide electrical shielding thereof from other components supported by said base frame, said panel being removable from said shield to permit access to the electronic elements thereon, means for securing said insulating panel and said enclosing shield to said base frame, an elongated housing portion adapted to engage said first housing portion and in cooperation therewith to enclose the entire electronic unit to form a completed housing, fastening means for securing said elongated housing portion to said base frame to permit separation thereof and access to the apparatus within, a sound transducer and a switch for operating said unit supported by said base frame and disposed at one end of said completed housing, thereby forming an electronic communication unit adapted to be held in the hand of a user during operation of said switch and utilization of said transducer.

References Cited in the file of this patent

UNITED STATES PATENTS

| | | |
|---|---|---|
| 1,993,436 | Eberhard | Mar. 5, 1935 |
| 1,980,842 | Andrews | Nov. 13, 1937 |
| 2,439,408 | Mitchell | Apr. 13, 1948 |
| 2,439,411 | Mitchell | Apr. 13, 1948 |
| 2,468,727 | Bauman | May 3, 1949 |
| 2,487,509 | Baker | Nov. 8, 1949 |
| 2,487,601 | Schnoor et al. | Nov. 8, 1949 |
| 2,496,424 | Temple | Feb. 7, 1950 |
| 2,499,589 | Kennedy | Mar. 7, 1950 |
| 2,521,423 | Stuck | Sept. 5, 1950 |

OTHER REFERENCES

"An All-Band Mobile Transmitter," Radio and Television News, April 1949, pp. 50, 51, 96, and 98.

Popular Science, "Football-Fans Radio," December 1938, pp. 220–222.

FM and Television, "How FM Was Used to Find Submarines," May 1946, pp. 22–24, and 57.